United States Patent Office 3,660,275
Patented May 2, 1972

3,660,275
CYCLIC HYDROGENATION-REFORMING
Ralph A. Carey, San Anselmo, and Robert L. Jacobson, Pinole, Calif., assignors to Chevron Research Company, San Francisco, Calif.
No Drawing. Filed Oct. 2, 1969, Ser. No. 863,330
Int. Cl. C10g 35/08, 23/04
U.S. Cl. 208—138                                    1 Claim

ABSTRACT OF THE DISCLOSURE

A process for alternately producing gasoline and jet fuel, in a reformer reactor containing a catalyst comprising platinum on alumina, by
(a) feeding a kerosene feedstock to the reformer reactor and hydrogenating the kerosene by contacting the kerosene with said catalyst in the presence of hydrogen at a temperature between 500° and 700° F., and at a relatively low pressure, for example, below 700 p.s.i.g.;
(b) preferably sweeping the catalyst bed with hot hydrogen;
(c) switching from a kerosene feed to the reformer reactor to a naphtha feed; and
(d) feeding a naphtha feedstock to the reformer reactor and contacting the naphtha with said catalyst at a temperature between 800° and 1100° F.

BACKGROUND OF THE INVENTION

Field of the invention

The present invention relates to naphtha reforming and kerosene hydrogenation. More particularly, the present invention relates to reforming and hydrogenation carried out alternately in the same reactor.

Prior art

Catalytic reforming processes are widely used for making high octane gasoline from naphthas of low octane rating. A number of different catalytic reforming processes are in use commercially but they have certain features in common. Their feedstocks are low octane gasolines or naphthas. They use a catalyst to promote the rearrangement of hydrocarbon molecules, for example, a hydrogenation-dehydrogenation type metal catalyst supported on an oxide carrier. The catalytic contact is carried out at elevated temperature, for example, about 800° F. and at superatmospheric pressure in the presence of hydrogen which can be supplied by a hydrogen-containing gas recycled from the reforming reactor effluent. Since the feed is a mixture of different hydrocarbons, including paraffins, naphthenes and aromatics, the reforming treatment results in a number of reactions that improve octane rating. The reactions include dehydrogenation of six-membered ring naphthenes to aromatics; isomerization of five-membered ring naphthenes (alkyl cyclopentanes) to six-membered ring naphthenes followed by dehydrogenation to aromatics; aromatization of paraffins by dehydrogenation and cyclization of straight-chain paraffins having at least 6 carbon atoms; isomerization of straight-chain paraffins to their branched-chain isomers; and hydrocracking of long-chain paraffins.

Typical conditions used for reforming of naphtha feedstocks include a temperature from 800° to 1100° F., a pressure from 100 to 1000 p.s.i.g., a hydrogen concentration from 500 to 20,000 standard cubic feet per barrel naphtha charge and a charge space velocity from 0.25 to 10 liquid volumes of naphtha per volume of catalyst per hour. It has previously been suggested that it is advantageous to start up or initiate the reforming reaction under temperature conditions which will extend the time period in which the catalyst can be employed to produce high yields of high octane gasoline. Thus, it had been previously proposed to initiate the reforming reaction at temperatures within the range of about 700° to 800° F., followed by gradual increase to normal operating temperatures of about 900° to 1000° F.

Proposed catalysts for reforming, according to the prior art, are catalysts comprising platinum on an alumina base or spacing agent, which alumina is largely in the form of eta-alumina or gamma-alumina. Particularly, it has been found that a catalyst comprising platinum on eta-alumina has high activity and selectivity and can be utilized for an extended period of time under proper conditions of pressure and recycle gas rates to produce high yields of high octane gasoline without necessitating interruption of the on-stream operation to regenerate the catalyst or to replace it with freshly prepared catalyst.

The hydrogenation of unsaturated hydrocarbons or hydrocarbon mixtures, by bringing them together with hydrogen into contact with a hydrogenation catalyst, is a well known art. Hydrogenation, using a platinum on eta-alumina catalyst is disclosed, for example, in U.S. Pat. 2,965,564. The disclosure of U.S. Pat. 2,965,564, particularly that disclosure relating to the platinum on eta-alumina catalyst, is incorporated by reference into the present patent application. The hydrogenation of aromatics by means of catalysts comprising platinum on alumina is applied to products of the petroleum industry for several purposes. For example, it is used for the preparation of cyclohexane from crude benzene, for the improvement of the smoke point of kerosenes, for an increase in specific combustion heat of fuels for jet engines, as well as for the improvement of lubricating oil properties.

As to combined hydrogenation and reforming operations, U.S. Pat. 3,222,274 discloses the use of a platinum-containing catalyst in one reactor for alternate naphtha hydrogenation and naphtha reforming.

The disclosure of U.S. Pat. 3,222,274 is directed primarily to hydrogenation of a naphtha feedstock. However, the patent states that according to a specific embodiment, the catalyst used is a platinum-containing catalyst capable of also being used for reforming and the temperature in the hydrogenation zone is periodically increased to a reforming temperature to produce high octane naphtha for a period and then reduced to produce jet fuel for another period. According to U.S. Pat. 3,222,274, the operation may be shifted from hydrogenation to reforming simply by raising the temperature. The disclosure of U.S. Pat. 3,222,274 is incorporated by reference in its entirety into the present patent application.

U.S. Pat. 3,222,274 is directed to treatment of a naphtha feedstock boiling up to 400° F., and preferably boiling within the range of 150° to 380° F. There is no disclosure in U.S. Pat. 3,222,274 of treating feedstocks boiling above 400° F. such as kerosene.

SUMMARY OF THE INVENTION

According to the present invention, a process is provided for alternately producing gasoline and jet fuel in a reformer reactor containing a catalyst comprising platinum on alumina, which comprises: feeding a kerosene feedstock to the reformer reactor and hydrogenating the kerosene by contacting the kerosene with said catalyst in the presence of hydrogen at a temperature between 500° F. and 700° F.; switching from a kerosene feed to the reformer reactor to a naphtha feed; and feeding a naphtha feedstock to the reformer reactor and reforming the naphtha by contacting the naphtha with said catalyst at a temperature between 800° and 1110° F.

The term "naphtha" is used in the present application to mean normally liquid hydrocarbon feedstocks having a normal end boiling point no higher than about 400° or 410° F. Thus, the naphtha feedstock can boil between about 100° and 400° F. More typically, the naphtha feedstock boils between about 150° F. and 360° or 380° F.

The term "kerosene" is used in the present application to mean a hydrocarbon feedstock boiling at least in part above 400° F. Thus, the kerosene feedstock can boil from around 200° up to 550° F. More preferably, a kerosene feedstock used in the process of the present invention boils between about 320° to 480° F.

To determine the end boiling point of the naphtha or kerosene feedstocks, an ASTM D-86 distillation method is used.

The present invention is based in large part on the unexpected finding that a reforming catalyst comprising platinum on alumina can be successfully used for hydrogenation of kerosene feedstocks in a reforming reactor and then used for naphtha reforming without incurring a substantial decrease in the activity of the catalyst for naphtha reforming as a result of the prior kerosene hydrogenation. Hydrocarbon material boiling above about 420° F. contains constituents that are particularly likely to foul and substantially decrease the activity of the reforming catalyst. Because the kerosene feedstock contains heavy hydrocarbons in the material boiling above 420° F., it was feared that reforming activity of the naphtha reforming catalyst would be substantially decreased by use of the catalyst for kerosene hydrogenation. Also, it was not known whether the platinum on alumina catalyst would perform satisfactorily for hydrogenation of kerosene at relatively low pressures for which reforming equipment is normally designed; for example, pressures below about 700 p.s.i.g. It is well known that fouling in hydrogenation operations increases at lower pressures, specifically, lower hydrogen partial pressures.

Our laboratory test results show that alternate hydrogenation-reforming can be conducted for more than 4000 hours, including at least 1000 hours of kerosene hydrogenation, without regeneration of the catalyst. By "regeneration" is meant an oxidation procedure wherein the catalyst is regenerated by burning carbonaceous material off the catalyst.

DISCUSSION OF EXAMPLE RUN

Table I below summarizes the results from an example run wherein a pilot plant reformer reactor was used for alternate kerosene hydrogenation and naphtha reforming. The catalyst used in this example was a commercial platinum on alumina catalyst. The catalyst contained about 0.75 weight percent platinum, about 0.75 weight percent chloride and about 98.5 weight percent alumina. The feed stocks were hydrotreated in a conventional first stage of a two stage catalytic reformer to remove impurities such as sulfur and nitrogen, and to partially saturate olefins and polynuclear aromatics. The cyclic operation was started up with reforming operation, using normal catalytic reforming naphtha feed and normal operating conditions for reforming. After reforming operation was conducted for a short period, to establish base reformate yield and catalyst activity, the naphtha feed was discontinued and the reactor was swept for eight hours with hot gas. Then hydrogenation operation was started, using a kerosene feedstock which was obtained from a fluid catalytic cracker fractionation column. After hydrogenation for a number of hours, as indicated in Table I, the hydrogenation operation was stopped, the reactor was swept with hot hydrogen gas, and naphtha reforming operation was again commenced to determine if the catalyst retained good activity for naphtha reforming.

TABLE I

|  | Reforming | Hydrogenation | Reforming | Hydrogenation | Reforming |
|---|---|---|---|---|---|
| Feed boiling range, ASTM D-86: | | | | | |
| 5% | 195 | 350 | | 340 | |
| 50% | 258 | 417 | | 405 | |
| 95% | 362 | 455 | | 436 | |
| EP | 389 | 487 | | 488 | |
| Run hours | 42-66 | 66-650 | 650-720 | 720-970 | 970-1,032 |
| Average catalyst temp., °F | 924 | 610 | 926 | 630 | 928 |
| Pressure, p.s.i.g | 500 | 685 | 500 | 685 | 500 |
| Space rate, L.H.S.V | 1.8 | 1.05 | 1.8 | 1.05 | 1.8 |
| Gas rate, s.c.f. of H₂ per barrel of feed | 7,000 | 10,000 | 7,000 | 10,000 | 7,000 |
| H₂ consumption | | 900 | | 1,075 | |
| H₂ partial pressure in reactor, p.s.i.g | | 600 | | 600 | |

|  | Feed | Product | Feed | Product | Feed | Product | Feed | Product | Feed | Product |
|---|---|---|---|---|---|---|---|---|---|---|
| Inspections: | | | | | | | | | | |
| Gravity, °API | 54.2 | 46.7 | 34 | 38.8 | 54.2 | 46.4 | 34 | 39.5 | 54.2 | 46.5 |
| Aniline pt., °F | 117 | 101.8 | 64.8 | 116.6 | 117 | 101.6 | 64.8 | 124.6 | 117 | 101.6 |
| Smoke pt., mm | | | 9 | 17 | | | 9 | 20 | | |
| Paraffins, vol. percent | 48.1 | | 16.7 | 15.7 | 48.1 | | 16.7 | 16.0 | 48.1 | |
| Naphthenes | 36.7 | | 23.2 | 59.5 | 36.7 | | 23.2 | 67.7 | 36.7 | |
| Aromatics | 15.2 | | 60.1 | 24.8 | 15.2 | | 60.1 | 16.3 | 15.2 | |
| C₅⁺, vol. percent | | 83.5 | | 102.5 | | 83 | | 102.5 | | 83 |
| C₅⁺ F-1 clear octane | 63.2 | 94 | | | 63.2 | 94 | | | 63.2 | 94 |

The results shown in Table I illustrate that kerosene can be hydrogenated in a naphtha reformer reactor without substantially decreasing activity of the reforming catalyst for naphtha reforming. As can be seen from Table I, the naphtha reformate produced before any kerosene hydrogenation had an aniline point of 101.8 and an octane of about 94. After continuous kerosene hydrogenation, for about 600 hours, by contacting kerosene with the reforming catalyst at the relatively low kerosene hydrogenation pressure of 685 p.s.i.g., the reforming catalyst still had about the same activity for reforming. As is seen by the data for the reforming cycle after the first hydrogenation cycle, the reformate produced had an aniline point of 101.6 and an octane of about 94.

It should be noted that the kerosene feedstock which was hydrogenated was a rather difficult feedstock in terms of aromatic content. The kerosene feedstock contained about 60 vol. percent aromatics, but still the hydrogenation operation was successful in converting the kerosene feedstock to an ASTM smoke point close to 20 mm. Thus, it is clear that most kerosene feedstocks can be converted to jet fuels meeting a 20 mm. smoke point specification, using the cyclic process of the present invention.

It is preferred to sweep the catalyst bed after hydrogenation operation with hot hydrogen-rich gas for a period of at least several hours. The hydrogen sweep aids in the removal of heavy hydrocarbon components left in and on the catalyst. The hot hydrogen sweep is preferably carried out at a temperature of about 600 to 700° F. for at least one hour and then the temperature of the recycle hydrogen is gradually raised to about 900° F. before the naphtha reforming is begun. In our laboratory runs referred to in Table I above, about 20 vol. percent of the recycle hot hydrogen sweep gas was steadily bled off and the total recycle hot hydrogen sweep was about the same as the hydrogen rate used during hydrogenation.

Although various specific embodiments of the invention have been described and shown, it is to be understood they are meant to be illustrative only and not limiting. Certain features may be changed without departing from the spirit or essence of the invention. It is apparent that the present invention has broad application to alternate kerosene hydrogenation and naphtha reforming, carried out in a common reactor. Accordingly, the invention is not to be construed as limited to the specific embodiments illustrated but only as defined in the appended claim.

What is claimed is:

1. A process for alternately producing gasoline and jet fuel in a reformer reactor, designed as reforming equipment for use at pressures below 700 p.s.i.g., and containing a catalyst comprising platinum on alumina which comprises:

(a) feeding a kerosene feedstock which has an end boiling point above about 420° F. to the reformer reactor and hydrogenating the kerosene by contacting the kerosene with said catalyst in the presence of hydrogen at a temperature between 500° and 700° F. and at a pressure below about 700 p.s.i.g.

(b) switching from the kerosene feed to the reformer reactor to a naphtha feed;

(c) feeding the naphtha feedstock to the reformer reactor and contacting the naphtha with said catalyst at a temperature between 800° and 1000° F. and at a pressure below about 700 p.s.i.g.; and (d) operating the reformer without catalyst regeneration for a total of at least 4000 hours, including at least 1000 hours of kerosene hydrogenation.

References Cited

UNITED STATES PATENTS

| 2,902,436 | 9/1959 | Mills | 208—138 |
| 2,965,564 | 12/1960 | Kirshenbaum et al. | 208—217 |
| 3,222,274 | 12/1965 | Carl | 208—143 |

HERBERT LEVINE, Primary Examiner

U.S. Cl. X.R.

208—143